United States Patent [19]
Small

[11] Patent Number: 5,731,969
[45] Date of Patent: Mar. 24, 1998

[54] THREE-PHASE AC POWER CONVERTER WITH POWER FACTOR CORRECTION

[76] Inventor: Kenneth T. Small, 17595 Montebello Rd., Cupertino, Calif. 95014

[21] Appl. No.: 681,927

[22] Filed: Jul. 29, 1996

[51] Int. Cl.$^6$ .............................. H02M 7/06; H02M 7/68
[52] U.S. Cl. .................. 363/126; 363/65; 363/69
[58] Field of Search ...................... 363/16, 26, 65, 363/126, 69, 70; 323/271, 272, 222

[56] References Cited

U.S. PATENT DOCUMENTS

| | | | |
|---|---|---|---|
| 4,672,516 | 6/1987 | Ney et al. | 363/16 |
| 4,680,689 | 7/1987 | Payne et al. | 363/26 |
| 5,146,396 | 9/1992 | Eng et al. | 363/16 |
| 5,224,025 | 6/1993 | Divvan et al. | 363/16 |
| 5,311,419 | 5/1994 | Shires | 363/65 |
| 5,329,439 | 7/1994 | Borojevic | 363/87 |
| 5,404,092 | 4/1995 | Gegner | 363/65 |
| 5,530,635 | 6/1996 | Yashiro | 363/65 |
| 5,534,768 | 7/1996 | Chvannes | 363/70 |
| 5,568,373 | 10/1996 | Small . | |
| 5,631,818 | 5/1997 | Jhonnson et al. | 363/126 |

OTHER PUBLICATIONS

Micro Linear Corp. Application Note 19 page 10–120 to 134.
1993 Data Book ML4818 IC data page 6–93 to 6–104.
Unitrode Corp. Application Note U–136 page 9–393 to 406.
1993 Data Book UC1875 IC data page 5–256 to 264.

*Primary Examiner*—Peter S. Wong
*Assistant Examiner*—Rajnikant B. Patel

[57] ABSTRACT

A solid-state, PFC power converter for converting 3-phase AC to DC in a single, isolated conversion step, using 3 forward converters. Converter outputs share a common output choke, permitting operation at low instantaneous AC input voltage. Each forward converter is "duty" modulated proportional to its rectified AC input voltage, producing unity input power factor. The constant of proportionality for 3 converters is controlled to regulate the DC output voltage. A control circuit provides immunity to AC input distortion and noise. The control circuit operates with various forward converter topologies, and is compatible with integrated circuit processes. A version using phase or symmetry modulated full-bridge converters, requires only 2 output rectifiers.

11 Claims, 10 Drawing Sheets

FIG. 13

THREE-PHASE AC POWER CONVERTER WITH POWER FACTOR CORRECTION

CROSS-REFERENCES TO RELATED APPLICATION

The present invention uses the symmetry modulation method of co-pending application, Ser. No. 08/281,754 filed Jul. 28, 1994 by Kenneth T. Small.

FIELD OF THE INVENTION

The present invention pertains to the field of electronic power conversion. More specifically, the present invention is related to an apparatus and method of providing a power-factor corrected (PFC), input to output isolated, 3-phase AC to DC power converter.

BACKGROUND OF THE INVENTION

Figure 1:
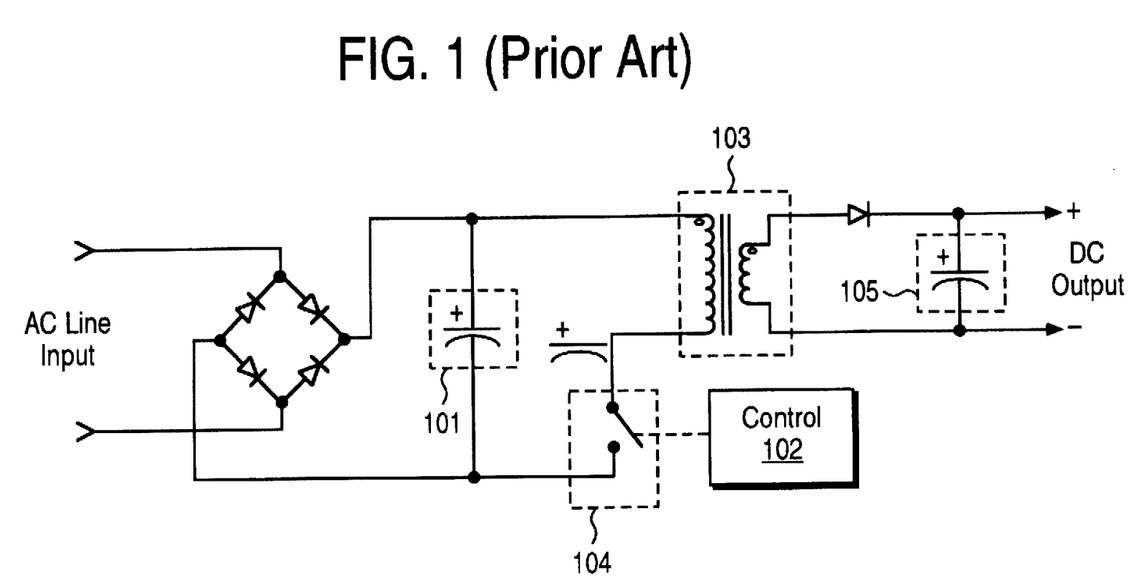
FIG. 1 is a simplified circuit diagram of a typical prior art flyback converter for producing unity power factor.

Various power converter circuit topologies and control methods are well known. AC to DC switching power converters that provide both input to output isolation and power factor correction (PFC), may consist of a single-phase, single-stage flyback topology as shown in FIG. 1. If a large "hold up" energy-storage capacitor 101 across the DC input bus is omitted, and a control 102 is appropriate, the AC input current can be controlled to be proportional to the AC input voltage. This produces unity power factor. A number of commercially manufactured integrated circuit flyback-topology controllers are available for this application. Some examples are: Unitrode UC3852, Motorola MC342621 and Micro-Linear ML4813. All 3 may be used with a flyback transformer 103, to provide DC isolation.

One characteristic of this single-phase, single-stage PFC flyback topology is the absence of "hold up" time. This is because input capacitor 101 is absent, and can not supply energy during a momentary loss of input power. Another characteristic is that there will be considerable DC output voltage ripple, because output power droops during the low voltage portions of the AC input sine wave. These two characteristics are not important for many loads. In this situation the flyback converter has an advantage, because the converter operates well, without capacitor 101.

Flyback converters are cost effective for power factor corrected applications at power levels below a few hundred watts. However, at higher power, and relative to other topologies, flyback converters suffer from the following weaknesses: 1. Higher peak voltages and currents in a solid-state power switch 104. 2. Larger main transformer 103. 3. Higher RMS ripple current in an output capacitor 105.

In contrast, "boost" converter topologies are often used at higher power. A boost converter is shown in block 210 of FIG. 2. Boost converters suffer less from the above 3 weaknesses listed for flyback converters. However, boost converters do not provide DC (galvanic) isolation between their inputs and outputs. When isolation is required, an additional (transformer isolated) power conversion stage is added. Often, a "forward" converter topology is used for the second stage, as shown in Block 220 of FIG. 2. Forward converters are efficient, small, and low cost. They are usually used above a few hundred watts. Unfortunately, the second stage converts all power a second time, lowering overall efficiency.

Figure 2:
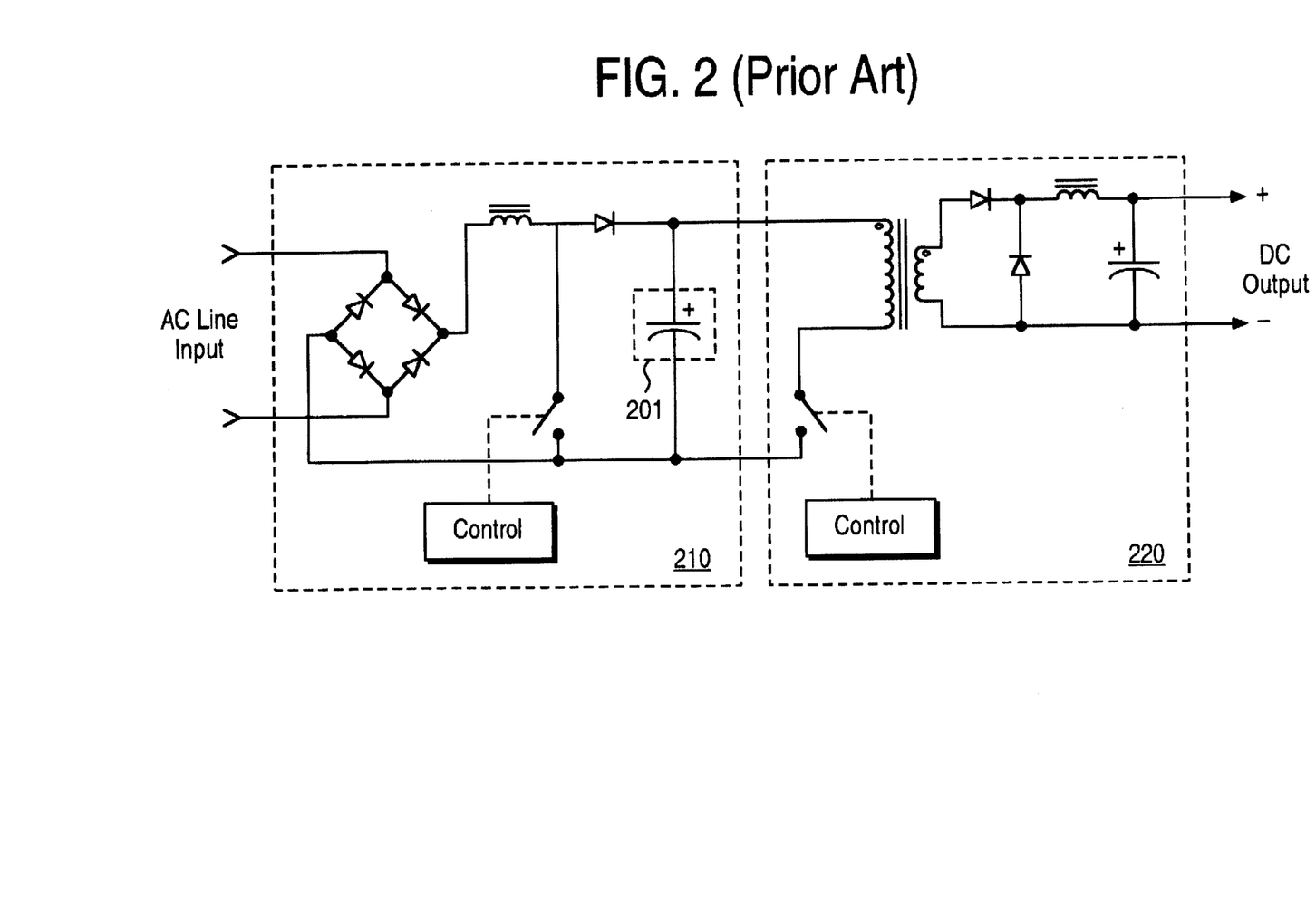
FIG. 2 is a simplified circuit diagram of a typical prior art 2-stage boost and forward converter for producing unity power factor.

The cost, space, and additional energy lost in second converter stage 220 are major shortcomings to this common approach of power factor correction. In addition, an energy storage capacitor 201 can not be omitted if not needed. The 2-stage circuit needs capacitor 201 between stages for proper operation.

Figure 3:
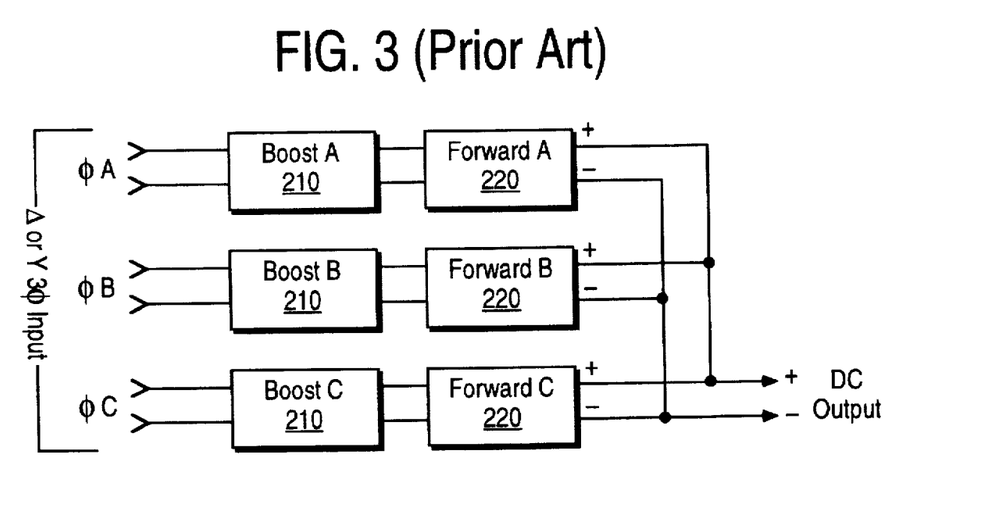
FIG. 3 is a block diagram of a 3-phase prior-art converter. It uses 3 of the 2-stage converters shown in FIG. 2 to produce unity power factor.

FIG. 3 shows a prior-art high-power PFC converter operating from 3-phase AC power and providing input-output isolation. It is similar to three, prior-art single-phase AC converters in FIG. 2. This 3-phase converter requires two stages. The first PFC boost converter stage provides power factor correction, and the second forward converter stage provides input-output isolation by using a transformer. A total of 6 converters are required. It is possible to combine the three forward converters into one, but the result is still a two-stage conversion process. In 2 stage PFC, 3-phase converters, the increased cost, size, and efficiency loss due to converting the power twice, are a disadvantage.

Non-PFC single-stage forward converter topologies (full-bridge, half bridge, push-pull, 2-transistor unipolar, and 1-transistor transistor unipolar) are well known. They are well suited for high-power levels because they do not have the 3 weaknesses listed for flyback converters. Unfortunately, single-stage forward converters will not produce unity power factor. The problem is that forward converters will not draw any AC input current at or below a fixed voltage level on the AC input voltage sine wave. This is a result of the fixed voltage conversion ratio, determined by the turns ratio in the output transformer. Usually, the DC output voltage is relatively constant, due to a voltage control regulator, or a battery or large capacitor across the DC output terminals. When the AC input voltage passes through the low voltage portions of the AC sine wave, a forward converter can not produce voltage equal to the DC output voltage. This prevents the converter from delivering output current. Since the AC input current cannot be made to track the AC input voltage at low instantaneous input voltage, unity power factor correction is not produced by an otherwise desirable forward converter.

Therefore, there is a need in the prior art for a 3-phase AC to DC, high-power, input-output isolated, high-efficiency, PFC power converter. A single-stage converter would be desirable over a 2-stage converter. The prior-art, non-PFC forward converter topologies have cost, size, isolation, and efficiency advantages. It would be advantageous be able to use this topology if it could produce unity power factor. The converter (preferably) should not require an energy storage capacitor.

SUMMARY AND OBJECTS OF THE INVENTION

The present invention pertains to single-stage, 3-phase AC to DC, PFC power converters. In one embodiment, each AC phase is connected to a separate, transformer-isolated forward converter. The converter outputs are series connected after the output rectifiers. The output filter choke provides a relatively constant current load for all 3 converters. The current load allows each forward converter to operate at low instantaneous AC input voltage. The minimum input voltage restriction of prior-art forward converters is eliminated. A new control algorithm adjusts each converter "on" percent or duty (D) to be proportional to a sine wave. The sine wave corresponds to AC input voltage. This results in unity power factor. The control for all 3 converters is integrated into one, common circuit, that regulates and controls all converters.

Also, energy efficiency improves because power is converted only once, by a desirable and efficient forward converter. AC line frequency ripple components in the DC output cancel, reducing output ripple and noise.

In another similar embodiment, the converter outputs are series connected ahead of (rather than after) the output rectifiers. The number of rectifiers is reduced from six to two, reducing cost, size, and power loss. The desirable full-bridge type forward converters are used. Phase or symmetry modulation is used with three, full-bridge converters. The combination results in low output impedance during "off-time". This shorts the output transformer voltage, clamping the current drive from the other "on" converters, thereby permitting operation with fewer than 6 rectifiers. The same (new) integrated control, sets each "on" percent duty (D) of each of 3 converters, producing unity power factor. The timing of 3 converters is arranged to reduce transistor switching loss, and to simplify the transistor drive circuitry.

Further objects and advantages of my invention will become apparent from a consideration of the drawings and ensuing description.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A 3-phase AC input, power factor corrected (PFC) power converter is described. In the following description, for purposes of explanation, many specific details are set forth, such as component values, voltages, currents, frequencies, etc., in order to provide a thorough understanding of the present invention. It will be obvious to one skilled in the art that the present invention may be practiced without these specific details. In other instances, well known structures are shown in block diagram form in order to avoid unnecessarily obscuring the present invention.

Figure 4:
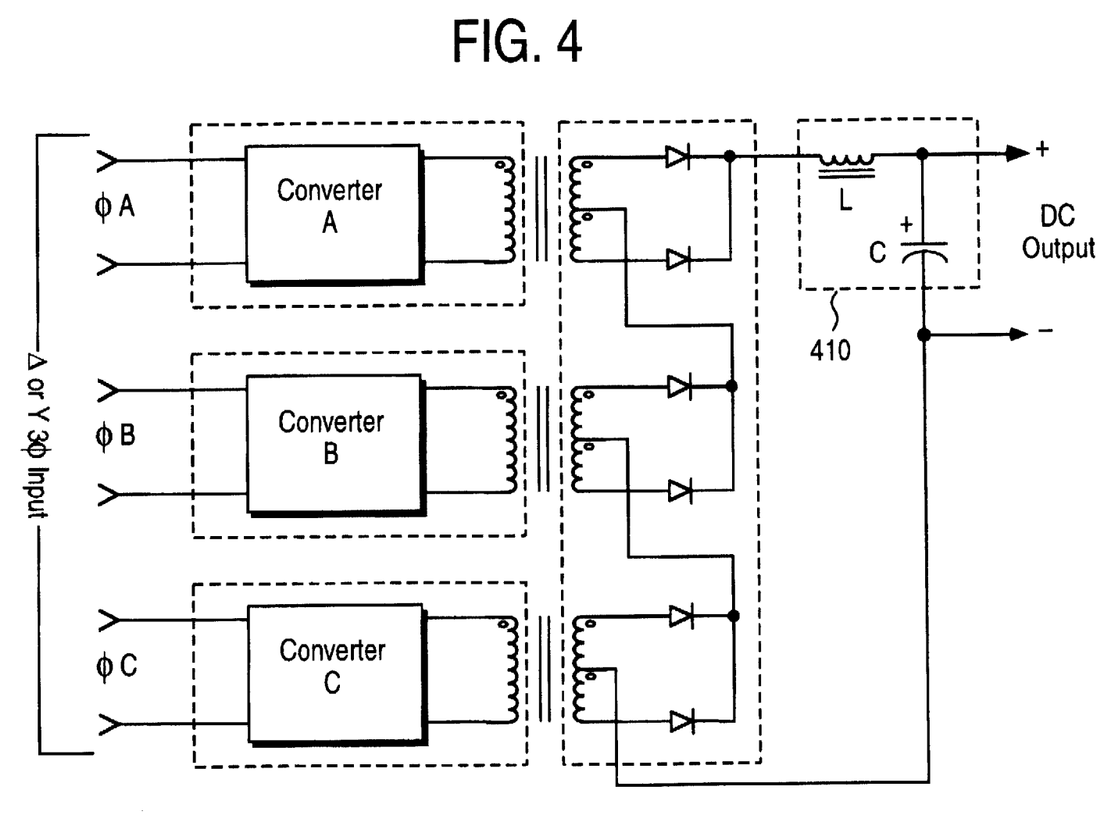
FIG. 4 is a simplified schematic and block diagram of a 3-phase, single-stage converter of the present invention for producing unity power factor.
Figure 5:
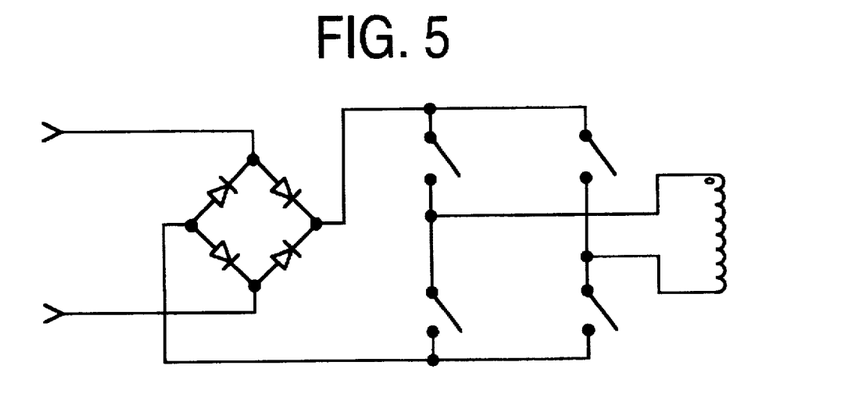
FIG. 5 is a simplified schematic diagram of a prior art full-bridge forward converter.
Figure 6:
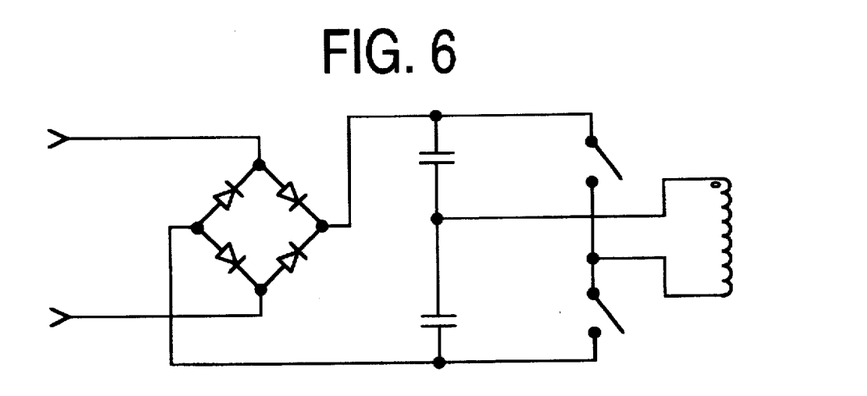
FIG. 6 is a simplified schematic diagram of a prior art half-bridge forward converter.
Figure 7:
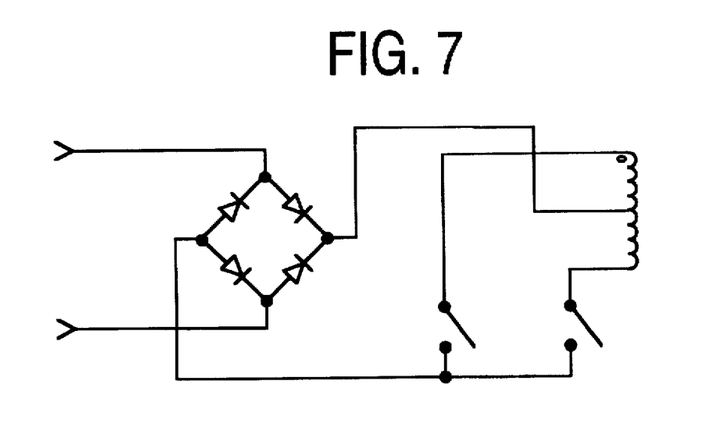
FIG. 7 is a simplified schematic diagram of a prior art push-pull forward converter.
Figure 8:
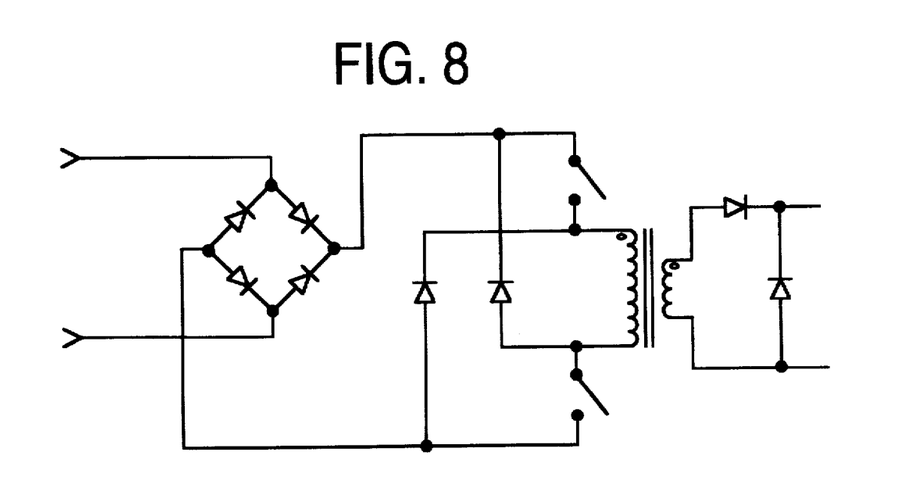
FIG. 8 is a simplified schematic diagram of a prior art 2-transistor unipolar-pulse forward converter.
Figure 9:
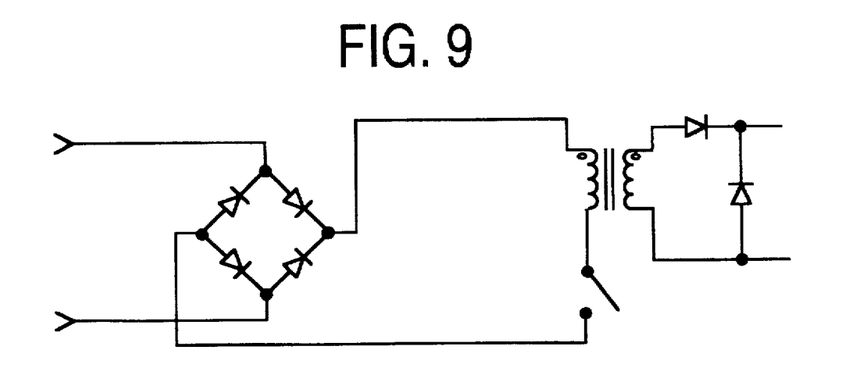
FIG. 9 is a simplified schematic diagram of a prior art 1-transistor unipolar-pulse forward converter.

FIG. 4 shows a simplified schematic diagram of a first embodiment of the present invention. The outputs from forward converters A, B, and C are connected in series, after each pair of output rectifiers. Forward converters are a well known, general class of power converters where output power is transferred only during the portion of the switching cycle while the power transistor(s) is turned on. Most types of forward converters may be used by incorporating 3 of them into the circuit of FIG. 4. Some common, usable, forward converter circuits are shown in other figures as follows: FIG. 5 is a full-bridge, FIG. 6 is a half-bridge, FIG. 7 is a push-pull, FIG. 8 is a two transistor, unipolar output pulse type, FIG. 9 is a one transistor, unipolar output pulse type. Circuits in FIGS. 5, 8, and 7 use the 3 full-wave center-tapped output rectifier circuit shown in FIG. 4. Alternately, 3 full-wave bridge rectifiers may also be used. If FIG. 8 or 9 is used, the half-wave output rectifier circuit shown in FIG. 8 and 9 must also be included for substitution into FIG. 4.

The converters in FIG. 4 typically operate in the switching frequency range of 20 kHz to 200 kHz. The frequency is not critical, and may be chosen to balance cost, size, and efficiency factors. An output filter 410 is a typical L-C filter used with conventional forward converters. Inductor L in 410 is sufficiently large to maintain relatively constant current during the switching cycle. Inductor L provides a high AC impedance at the switching frequency across each converter output. This isolates each converter, and permits it to operate independently of others at any switching phase or switching frequency, with minimal interaction problems from the other converters. Whenever converter A, B, or C turns on, it draws current from its AC input that is proportional to the current flowing in inductor L. While a converter is off, the current drawn from its AC input is zero. Therefore, the average AC input current draw by a converter is proportional to current in inductor L, multiplied by an "on percent" or duty (D) of that converter. If desired, an L-C noise filter may be used to reduce switching current noise conducted back onto the AC input lines. If a individual converter duty (D) is controlled to be proportional to its AC input voltage, its resulting AC input current will be proportional to its AC input voltage. This represents unity power factor for that converter. Each converter is controlled in this manner, producing 3-phase unity power factor.

It is well known, that in a unity power factor polyphase AC system, total instantaneous power is constant over time. Because the 3 converter total input power is constant, the DC output power and inductor L current are also constant over the 3-phase AC input cycle. This permits the invention to be used where AC line frequency induced ripple in the DC output voltage is not desirable. In theory, using "ideal" components will simultaneously produce both unity power factor and zero output ripple related to the AC line frequency. In practice, there are losses and non-linearities in power semiconductors and magnetics. This precludes obtaining simultaneous unity power factor and zero ripple. However, a control algorithm may be adjusted slightly to favor either unity power factor or zero ripple, depending upon the application. Alternately, the converter may be optimized for unity power factor. An active or passive filter can then be added to the DC output to remove ripple components. The additional filter is practical, because output ripple power represents only a few percent of the total converter output power. Also, the dominant ripple frequencies are 6 and 12 times the AC line frequency, which filters more easily than AC line frequency.

Figure 10:
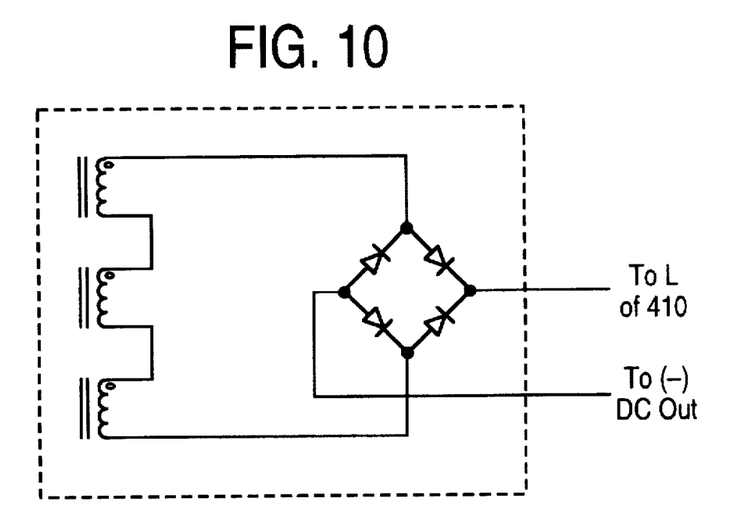
FIG. 10 is a schematic diagram of a full-wave bridge rectifier and 3 transformer circuit of the present invention.
Figure 11:
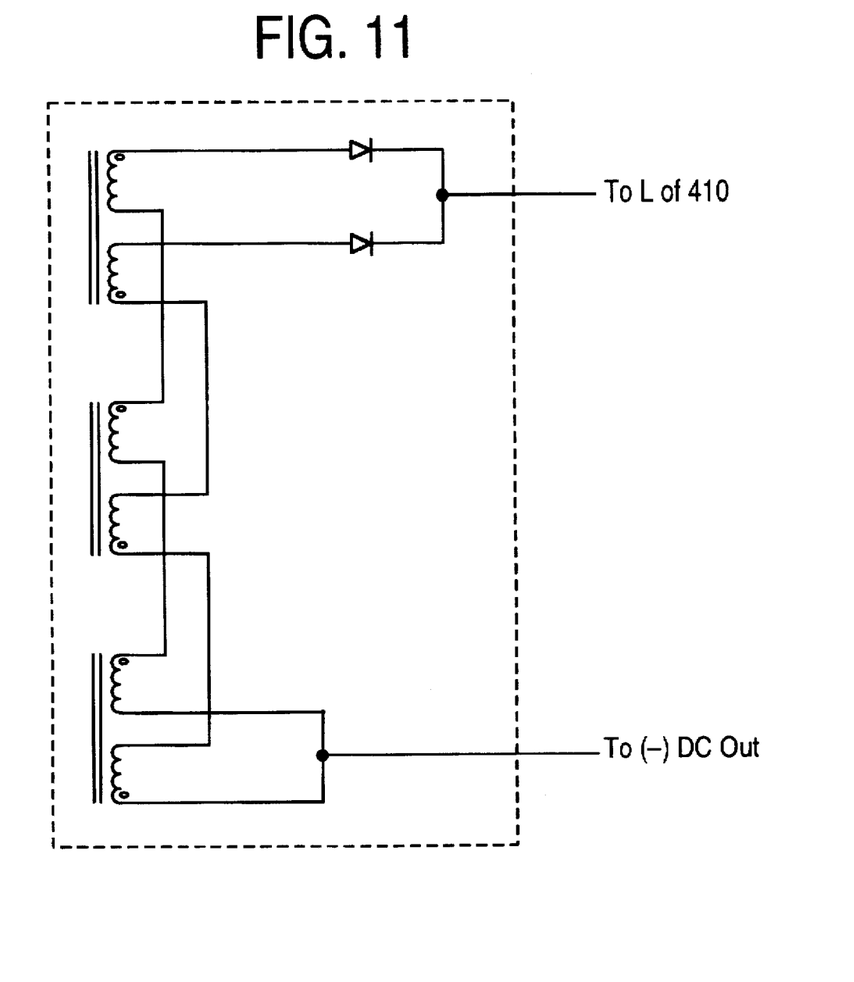
FIG. 11 is a schematic diagram of a full-wave center-tapped rectifier and 3 transformer circuit of the present invention.
Figure 12A:
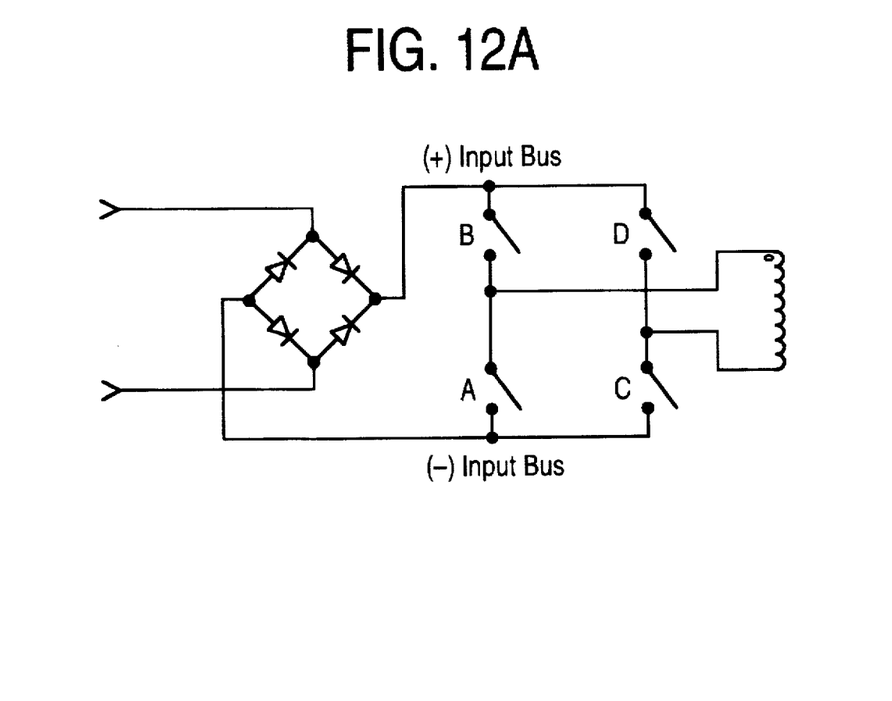
FIGS. 12a to 12c are a simplified schematic diagrams of a prior art full-bridge converter. Included are pulse-timing diagrams of 2 modulation methods that are compatible with the present invention.
Figure 12B:
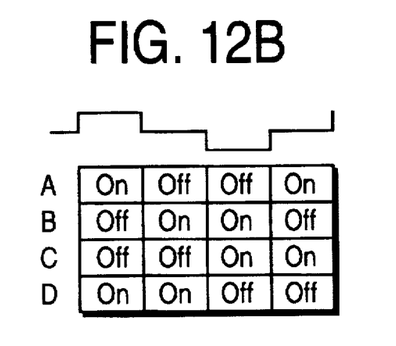
Figure 12C:
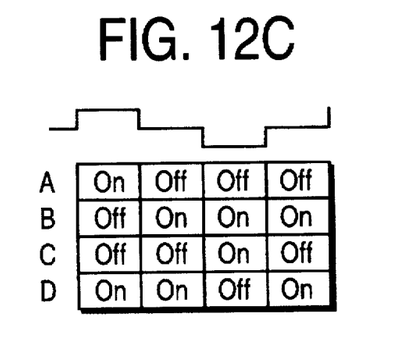

In a second embodiment of the present invention, the circuit diagram in FIG. 4 is modified by substituting the transformer secondary and rectifier circuit from either FIG. 10 or FIG. 11 into FIG. 4. The change eliminates the individual output "catch" rectifiers for each converter. This results in a substantial energy and cost savings, especially if the DC output current is substantially above the AC input current. However, connecting 3 secondary windings in series without individual "catch" rectifiers is difficult. When "off", the primary-circuit output impedance of most forward converters (FIGS. 6,7,8,9) is high. When "off", they will series-block all output voltage from any other "on" converter. Therefore, these 4 converter types are not usable. To function correctly, a converter must have low impedance in the "off" state. FIG. 12 shows a pulse timing diagram of the 4 transistors in a full-bridge with "phase modulation" and with "symmetry modulation". Using either of these modulation methods will produce low primary-circuit output impedance in the "off" state. This is accomplished by using 2 of 4 full-bridge transistors to short both ends of the transformer primary to one input bus in the "off" state. Therefore, in the second embodiment, FIG. 12 full-bridge circuit and either 1 of the 2 illustrated modulation methods also are included in FIG. 4.

Phase modulation is further described as a full-bridge converter whose right and left bridge halves both operate with 50% top and 50% bottom duty. The phase relationship between left-half and right-half square waves is varied to control the output "on" percent or duty (D). Maximum output occurs when the two square waves are out of phase with each other. The output waveform is similar to a conventional pulse width modulated (PWM) full-bridge, except the converter primary output impedance is always low. Commercial available integrated circuits for phase modulation are manufactured by Micro Linear Corporation, San Jose, Calif. (Part # ML4818), and Unitrode Integrated Circuits Corporation, Merrimack, N.H. (Part # UC3875). Both companies provide application notes with more detailed theory and explanations.

Phase modulation is further described as a full-bridge converter with "on" percent determined by the "on" duration of the 2 lower bridge transistors. When a lower transistor is off, the transistor directly above is on. Lower bridge transistors alternate with equal "on" pulses, during the switching cycle. The converter primary output impedance is low in the "off" state, because the upper bridge transistors short circuit the transformer primary leads to the (+) input bus of the transistor bridge. More information on symmetry modulation can be found in a U.S. patent application entitled, Tolerant Power Converter, 08/281,754 filed Jul. 28, 1994 by Kenneth T. Small.

One additional requirement for the second embodiment of the present invention is the relationship between "on" pulses of the 3 converters. The switching frequency and phase of each converter must match the other converters. The secondary voltages of the 3 transformers must be in phase, so that their voltages will add, rather than subtract. As a practical matter, it is preferred and less complicated to start the "on" period of all three converters at the same time. If phase modulation is used, this will result in 1 vertical pair of transistors in each full-bridge converter having identical switching waveforms. This represents a simplification of the 3-converter, regulator control circuit.

Beginning all "on" periods together is also preferred. This allows the use of capacitors (approximately 0.01 uF) across each switching transistor or transformer primary. Capacitors reduce switching losses, which will allow an increase in switching frequency. Higher frequencies permit smaller magnetic components. This technique is sometimes used with single-phase, phase or symmetry modulated full-bridge converters. It uses the energy trapped in output transformer leakage inductance to charge the capacitors, rather than generating turn-on and turn-off switching losses in the transistors. Since the 3 transformer secondary windings are connected in series, the energy is shared and must be used simultaneously by all 3 converters to charge capacitors in all 3 converters. Starting "on" periods together accomplishes this.

Figure 13:
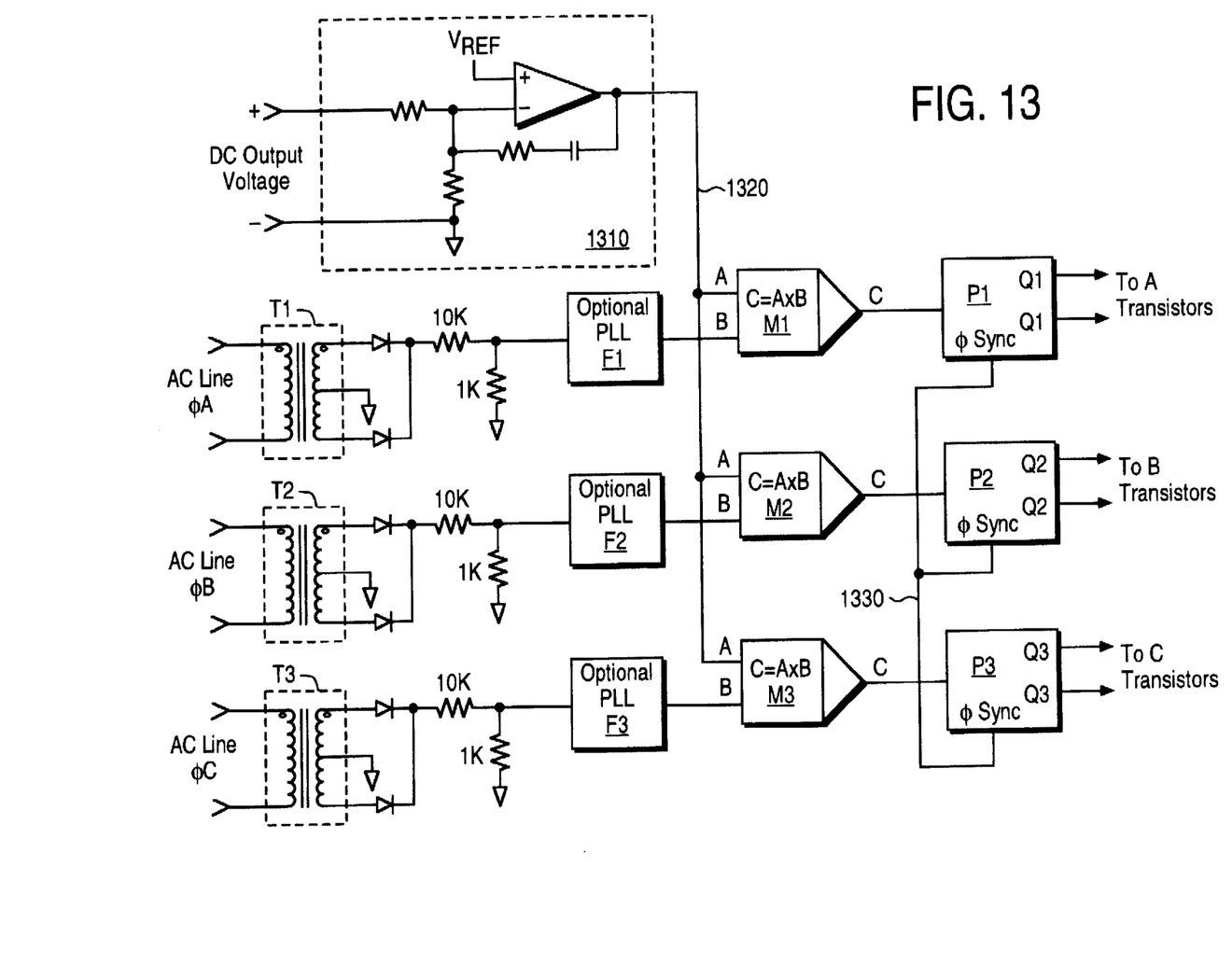
FIG. 13 is a simplified schematic and block diagram of an integrated control circuit of the present invention.

FIG. 13 is a schematic and block diagram of the control circuit. It shows details of typical control hardware used to implement unity power factor, and output voltage regulation. FIG. 13 may be implemented with standard, multiple-sourced integrated circuits. A simple, voltage control loop is used. It is simplified to illustrate principles and basic features. Those familiar with power converter technology, will understand how to implement the details of well-known "circuit-functions" that appear as "blocks". Some other "housekeeping" functions are supplied within 3 pulse-width-modulator (PWM) control integrated circuits P1,P2, P3. FIG. 13 circuit is compatible with all embodiments of the invention, providing an appropriate PWM integrated circuit is utilized. Many operating principles were previously explained. Following is additional information and explanation of optional "enhancements" that improves performance.

The sine wave for each AC line input (phase A, B, C) is isolated by transformers (T1, T2, T3). Isolation allows the control circuit to be connected together, and referenced to the DC output voltage. The 3 AC voltages are rectified and scaled by a resistive voltage divider. Optional filters (F1, F2, F3) may be used to "filter-out" AC line noise transients, and to "clean-up" the sine waves present on the AC line phases. The filters prevent AC line transients from affecting the control loop and producing DC output noise. Also, some converter application specifications (such as IEC555-2) require sine-wave input currents with low harmonic-current content. With filters, poor AC line voltage waveforms do not increase AC line harmonic currents. The filters provide clean, rectified sign-waves to the control circuit, resulting in sine-wave AC line currents. The filters may be an active (or passive) low-pass type. Or, phase-locked-loops (PLL) may also be used (replacing F1, F2, F3) to generate 3 rectified-sine waveforms that are phase-locked to each AC input line. The 3 equal, constant-amplitude outputs from 3 PLL is an advantage in some applications. It causes the 3 AC input currents to be equal and balanced, even if there is a voltage difference between the 3 AC line inputs. Fortunately, only 1 (not 3) PLL are required. The fixed, 120 degree phase relationship between AC input phases allows one PLL to generate the 3 rectified-sine waveforms. Only 1 of the 3 AC input lines needs to be sensed to generate an AC "zero-crossing" signal. This signal can be obtained with an inexpensive opto-coupler circuit, eliminating T1, T2, T3, and related parts. Alternately, only T1 may be retained for the "zero-crossing" signal, and for supplying about 15 volts DC for control and transistor drive power.

An error amplifier 1310 in FIG. 13 compares a fixed reference voltage to the DC output voltage. An amplified and filtered "difference" or "error" signal 1320 is applied to multipliers M1, M2, M3. All 3 rectified sign waveforms are scaled (multiplied) by "error" signal 1320 within multipliers M1, M2, M3. "Error" signal 1320 sets the magnitude of the 3 rectified-sine waveform that are applied to pulse width modulator inputs of P1,P2,P3. This controls "on" percents of outputs Q1, Q2, Q3. The three individual power converters turn "on" in response to these outputs. An oscillator synchronization connection 1330, locks together the switching frequency and phase of P1,P2,P3 and all converters.

Common housekeeping and control functions are included with many PWM integrated circuits used for P1,P2, P3. These functions include: output current control, softstart, sync, paralleling, undervoltage lockout, etc. Only 1 PWM integrated circuit is needed to supply these functions. Therefore, these duplicated functions will be unused in the other 2 PWM integrated circuits.

Also, the control circuit is physically large and complex because it consists of approximately 5 to 10 standard integrated circuits. Fortunately, the control circuit (excluding transformers) contains few (if any) components that can not be easily integrated into a single, dedicated integrated circuit that will replace the 5 to 10 integrated circuits of FIG. 13. This would eliminate unused features in PWM P2 and P3. It is also possible to integrate a single version of the control circuit that will work with all embodiments of the present invention. This is an advantage because it eliminates the cost of designing multiple integrated circuit versions of the control circuit.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense. Thus, a three-phase AC power converter with power factor correction is disclosed.

What is claimed is:

1. A transformer isolated, power factor corrected power converter for transferring power from a three phase alternating current input source to a direct current output load, said power converter comprising:

a first alternating current phase source coupled to an input of a first full bridge forward converter;

a first transformer winding coupled to an output of said first full bridge forward converter;

a second alternating current phase source coupled to an input of a second full bridge forward converter;

a second transformer winding coupled to an output of said second full bridge forward converter;

a third alternating current phase source coupled to an input of a third full bridge forward converter;

a third transformer winding coupled to an output of said third full bridge forward converter;

a single series circuit connection of said first winding, said second winding, said third winding, and a single 4 diode bridge output rectifier, wherein equal current flows in said series circuit connection.

2. The power converter of claim 1 further comprising a control method using symmetry modulation.

3. The power converter of claim 1 further comprising a control method using phase modulation.

4. The power converter of claim 1 further comprising:

a first control means for controlling a duty of said first converter to be proportional to a rectified waveform amplitude of said first alternating current phase source;

a second control means for controlling a duty of said second converter to be proportional to a rectified waveform amplitude of said second alternating current phase source;

a third control means for controlling a duty of said third converter to be proportional to a rectified waveform amplitude of said third alternating current phase source.

5. The power converter of claim 1 further comprising:

a fourth control means for controlling and regulating an output power of said power converter by varying a constant of proportionality in said first, second, and third control means.

6. A transformer isolated, power factor corrected power converter for transferring power from a three phase alternating current input source to a direct current output load, said power converter comprising:

a first alternating current phase source coupled to an input of a first full bridge forward converter;

a first and second transformer winding coupled to an output of said first full bridge forward converter;

a second alternating current phase source coupled to an input of a second full bridge forward converter;

a third and fourth transformer winding coupled to an output of said second full bridge forward converter;

a third alternating current phase source coupled to an input of a third full bridge forward converter;

a fifth and sixth transformer winding coupled to an output of said third full bridge forward converter;

a first series circuit connection of said first, said third, and said fifth transformer winding, and a first single output rectifier diode;

a second series circuit connection of said second, said fourth, and said sixth transformer winding, and a second single output rectifier diode;

wherein said first and said second series circuit connection function as a full wave center tap rectifier circuit using a total of two diodes for said power converter.

7. The power converter of claim 6 further comprising a control method using symmetry modulation.

8. The power converter of claim 6 further comprising a control method using phase modulation.

9. The power converter of claim 6 further comprising:

a first control means for controlling a duty of said first converter to be proportional to a rectified waveform amplitude of said first alternating current phase source;

a second control means for controlling a duty of said second converter to be proportional to a rectified waveform amplitude of said second alternating current phase source;

a third control means for controlling a duty of said third converter to be proportional to a rectified waveform amplitude of said third alternating current phase source.

10. The power converter of claim 6 further comprising:

a fourth control means for controlling and regulating an output power of said power converter by varying a constant of proportionality in said first, second, and third control means.

11. A method of converting three phase alternating current to direct current with isolation and near unity power factor, comprising the steps of:

utilizing 3 individual transformer coupled full bridge converters for each said phase;

connecting individual transformer output windings ahead of the output rectification process, thereby minimizing the number of rectifiers required;

synchronizing the frequency and phase of said full bridge converters to allow the individual transformer output voltages to add together constructively;

shorting the output of said full bridge converters during dead time by using either phase or symmetry modulation.

* * * * *